July 11, 1961     E. V. BLOOMQUIST ET AL     2,992,025
BUSHING DEMOUNTING MEANS

Filed Nov. 23, 1959     2 Sheets-Sheet 1

INVENTORS
EVERT V. BLOOMQUIST
GERALD E. BLOOMQUIST
By Lowell & Henderson
ATTORNEYS July 11, 1961  E. V. BLOOMQUIST ET AL  2,992,025
BUSHING DEMOUNTING MEANS Filed Nov. 23, 1959  2 Sheets-Sheet 2

INVENTORS
EVERT V. BLOOMQUIST
GERALD E. BLOOMQUIST
By Lowell & Henderson
ATTORNEYS United States Patent Office 2,992,025
Patented July 11, 1961

2,992,025
BUSHING DEMOUNTING MEANS
Evert V. Bloomquist and Gerald E. Bloomquist, both of
P.O. Box 807, Wausau, Wis.
Filed Nov. 23, 1959, Ser. No. 854,729
1 Claim. (Cl. 287—52)

This invention relates generally to sheave or pulley and shaft assemblies utilizing split bushings, and in particular to means for removing the bushing from the shaft.

After a prolonged period of use of a sheave and shaft assembly wherein a bushing of split or contractible type is utilized in securing the sheave to the shaft, the demounting of the sheave from the bushing has not only proved difficult, but in some instances the demounting of the bushing from the shaft has proved practically impossible without damage to the bushing.

An object, therefore, of this invention is to provide an improved bushing adapted for quick and easy demounting from the shaft about which it has been contracted.

A further object of this invention is to provide a bushing of split contractible type of a construction such that a conventional screw, utilized in the assembly and disassembly of the bushing with an associated sheave and shaft, is also utilized to effect a radial expansion of the bushing for disengagement from the shaft, should the bushing be rusted or otherwise bonded with the shaft.

Yet another object of this invention is the provision of a tapered split bushing wherein the bushing portions defining the split are adapted to threadably receive a conventional screw, utilized for mounting the bushing, in such a manner that continued insertion of the screw into the bushing effects a radial expansion of the bushing from a shaft contracted position to an expanded position therefor to provide for the removal of the bushing from the shaft.

These and other objects, features and advantages of this invention will become readily apparent from the following description when taken in conjunction with the accompanying drawings, wherein.

Figure 1:
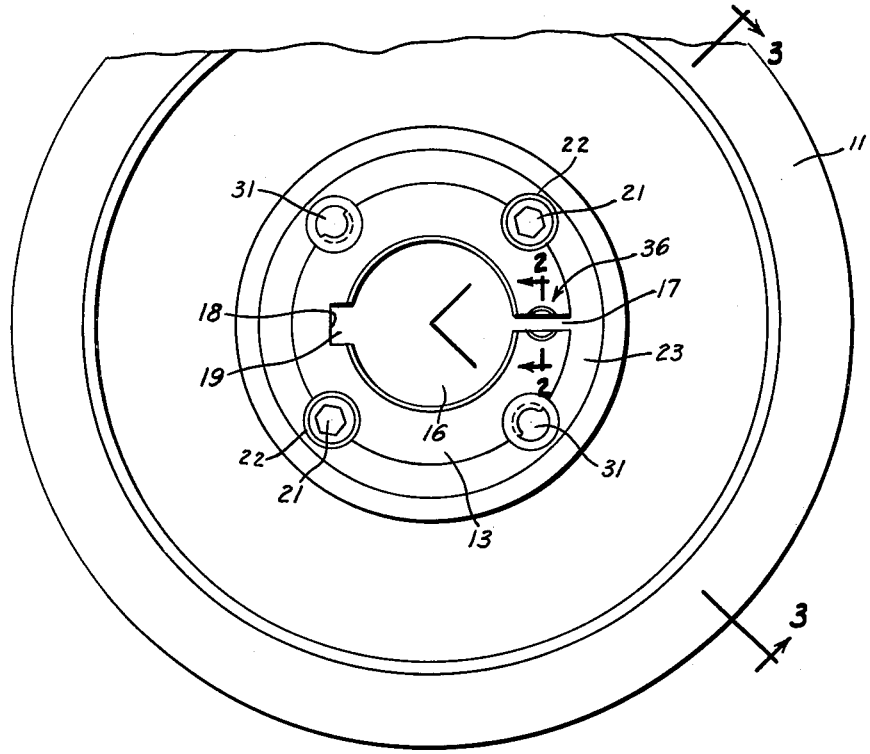
FIG. 1 is a fragmentary, side elevational view of a sheave and shaft assembly showing the bushing of this invention in assembly relation therewith.

Referring to the drawings, a sheave 11 (FIGS. 1 and 3) is illustrated as having a tapered bore 12 for receiving a tapered bushing 13 which has a bore 14 for receiving a shaft 16. The bushing 13 is formed with a longitudinal split 17 for contraction and expansion purposes and with a keyway 18 for engagement with a key 19 on the shaft 16.

Figure 3:
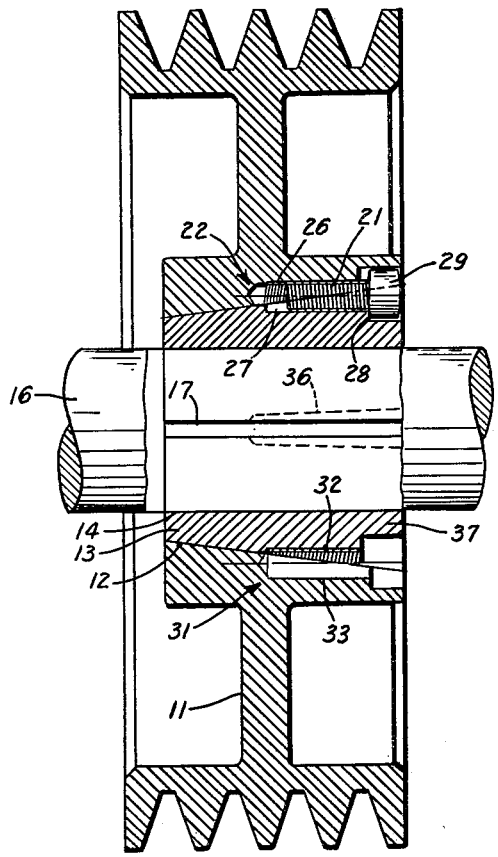
FIG. 3 is a fragmentary cross-sectional view taken along the lines 3—3 in FIG. 1.

For the purpose of this description, the embodiment of the sheave 11 and the bushing 13 other than the improvement to the bushing 13, is illustrated in U.S. Patent No. 2,402,743 issued June 25, 1946. As described in detail in that patent and referred to generally herein, one arrangement for mounting the sheave 11 and bushing 13 to the shaft 16 is by the insertion of cap screws 21 (FIGS. 1 and 3) into holes 22 formed partly in the hub 23 of the sheave 11 and partly in the bushing 13 at its larger end 37 (FIG. 3). By forming threads in only that part 26 (FIG. 3) of each hole 22 in the hub 23, each screw 21 is in threaded engagement with the hub 23 and in contact engagement with a complementary groove 27 in the bushing 13.

To form an operative association between each screw 21 and the bushing 13, a shoulder 28 (FIG. 3) is formed in the bushing against which the head 29 of the cap screw is engageable. The length of a hole 22 is such that a screw 21 does not reach the inner end of the hole upon being tightened.

Thus, to assemble the structure, the bushing 13 is inserted into the sheave 11 and slipped onto the shaft 16. The respective portions of the holes 22 in the sheave and bushing are aligned, there being two holes 22 (FIG. 1) and the cap screws 21 are threadably inserted into the holes. When the screws have been tightened sufficiently for their heads 29 to abut the shoulder 28, further tightening will draw the sheave 11 and the bushing 13 into a contracted position between the sheave 11 and the shaft 16, whereby the bushing is secured tightly to the shaft.

To remove the sheave 11 and the bushing 13 from the shaft 16, another pair of holes 31 (FIGS. 1 and 3) are provided in which the same cap screws 21, used in the holes 22 for assembly purposes are utilized in the holes 31 as jacking screws to relatively move the hub 23 and bushing 13 whereby to release the bushing 13 from its frictional or clamped engagement with the hub 23 and the shaft 16. For this purpose, the holes 31 are formed partly in the hub 23 and partly in the bushing 13, with a threaded portion 32 (FIG. 3) in the bushing and a grooved portion 33 in the hub. A shoulder 34 is formed in the hub 23.

Assume that the screws 21 are removed from the mounting or assembly holes 22 and are inserted in the demounting holes 31. When the head 29 of each screw 21 engages a shoulder 34 (FIG. 4) formed in the hub 23, a continued tightening of the screw 21 will provide a reversed effect to that obtained during assembly. In other words, the bushing 13 and sheave 11 are moved relative to each other in directions opposite to that in which they were moved for wedging and contracting the bushing, thus permitting an expansion of the bushing 13 to its normal or uncontracted state.

The above described procedure for removing the bushing 13 is generally satisfactory, provided the bushing has not become frozen or bonded to the shaft by rust, corrosion and the like. Under such conditions the use of the cap screws 21, as jack screws, is ineffectual in the removal of the bushing 13. This invention is therefore directed primarily to an improvement of the bushing 13 whereby when such above-mentioned conditions exist, the bushing may be removed from the shaft without damage.

Figure 4:
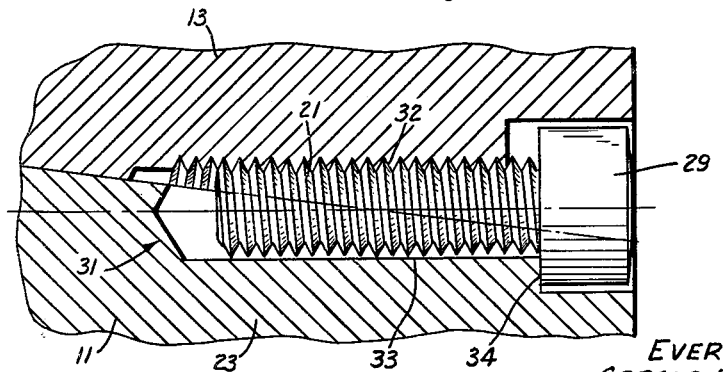
FIG. 4 is an enlarged, detail sectional view showing a screw inserted in a hole provided therefor for disengaging the sheave from the bushing.

Referring now to FIG. 4, assuming the bushing 13 is frozen to the shaft 16 (FIG. 3), it may be appreciated readily that continued threading of the screw 21 into the hole 31 will move the sheave 13 axially to the left as viewed in FIG. 4, until the screw 21 reaches the inner end of the threaded part 32 of the hole. This effects a disengagement of the sheave 11 from the bushing 13 and leaves a radial space between their complementary tapered surfaces.

Figure 2:
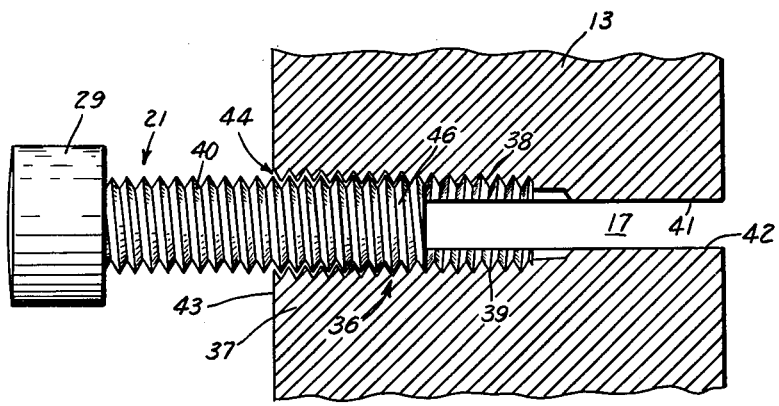
FIG. 2 is an enlarged detail sectional view taken along the line 2—2 in FIG. 1.

The bushing 13, at manufacture, is formed with a hole 36 (FIGS. 1 and 2) tapped or screw-threaded longitudinally of and coaxially with the split 17 in the end 37 of the bushing 13, whereby arcuate threaded portions 38 and 39 of the hole 36 are formed in the sides 41 and 42 of the bushing 13 defining the split 17. In the illustrative embodiment, the hole 36 is tapered inwardly from the face 43 (FIG. 2) of the bushing end 37. The hole 36 is also illustrated as being of a diameter and of a length such that, when in its contracted position about the shaft, one of the sheave mounting and demounting screws 21 is insertable into the outer exposed end 44 of the hole 36, and after further turning is engageable with the threaded portions 38 and 39 whereby continued turning of the screw 21 forces the bushing sides 38 and 39 away from each other in opposite directions.

This action thus results in the bushing sides 38 and 39 being moved away from each other in a radial-type expansion of the bushing 13 into the space between itself and the sheave hub 23 sufficient to release the bushing from its engagement with the shaft 16. It may be appreciated readily that by the provision of applying equal and opposite forces normal to the sides 41 and 42 of the bushing at the split 17, and wherein these forces against the bushing sides are substantially tangential to the periphery of the shaft 16, that an effective mechanical manner of freeing the bushing 13 from the shaft 16 is obtained.

It should be pointed out that screws other than those disclosed (21) may be used, the holes 36 being drilled and tapped accordingly. Also, although each hole 36 is tapered and the screw shank 40 is straight, the reverse may be true, or both hole and shank may be tapered. The only limitations are that irrespective of the width of the split 17 when contracted, the shank forward end 46 (FIG. 2) must be insertable into the hole 36, and there must be engagement of a portion of the shank 40 with a portion or a sufficient number of threads of the threaded portions 38 and 39 to force the bushing sides 41 and 42 apart enough to break the bond between the bushing 13 and the shaft 16.

Although only one preferred embodiment has been disclosed herein, various modifications and variations may be made within the full scope of the invention as defined in the appended claim.

I claim:

In an assembly including a sheave or the like and a bushing and a shaft therefor wherein the bushing is of a tapered type having a longitudinal split formed therein and adapted in use to be in a contracted position about the shaft, and further wherein the assembly includes straight threaded members for mounting the sheave and bushing relative to the shaft, means for removing the contracted bushing from the shaft including one of said threaded members, said bushing being formed, when in a contracted position about said shaft, with a circular threaded hole including an inwardly tapered portion, said hole being of a constant diameter at any cross-sectional area thereof and coaxial with the longitudinal axis of said split whereby opposed arcuate wall portions of said hole are formed in the sides of said bushing defining said split, with the threads of said tapered portion of said circular threaded hole being identical with the threads of said straight threaded members, and with said one threaded member being insertable into said threaded hole for a full line engagement thereof, whereby continued insertion of said one threaded member into said hole moves said wall portions away from each other.

References Cited in the file of this patent

UNITED STATES PATENTS

| | | |
|---|---|---|
| 2,402,743 | Firth | June 25, 1946 |
| 2,519,958 | Firth | Aug. 22, 1950 |
| 2,524,903 | Firth | Oct. 10, 1950 |